(12) United States Patent
Awasthi et al.

(10) Patent No.: US 12,062,242 B2
(45) Date of Patent: Aug. 13, 2024

(54) METHOD AND SYSTEM FOR REAL-TIME CONTINUOUS LANE MAPPING AND CLASSIFICATION

(71) Applicant: HL Klemove Corp., Pyeongtaek (KR)

(72) Inventors: Arpit Awasthi, Haryana (IN); Akshat Agrawal, New Delhi (IN); Kapil Yadav, Haryana (IN); Jitesh Kumar Singh, Karnataka (IN)

(73) Assignee: HL KLEMOVE CORP., Incheon (KR)

( * ) Notice: Subject to any disclaimer, the term of this patent is extended or adjusted under 35 U.S.C. 154(b) by 342 days.

(21) Appl. No.: 17/540,233

(22) Filed: Dec. 2, 2021

(65) Prior Publication Data
US 2022/0180644 A1 Jun. 9, 2022

(30) Foreign Application Priority Data
Dec. 3, 2020 (IN) .............................. 202011052696

(51) Int. Cl.
G06V 20/56 (2022.01)
B60W 40/072 (2012.01)
G06V 20/58 (2022.01)

(52) U.S. Cl.
CPC ......... *G06V 20/588* (2022.01); *B60W 40/072* (2013.01); *G06V 20/58* (2022.01); *B60W 2420/403* (2013.01); *B60W 2552/10* (2020.02); *B60W 2552/53* (2020.02)

(58) Field of Classification Search
None
See application file for complete search history.

(56) References Cited

U.S. PATENT DOCUMENTS

| 2015/0371095 | A1* | 12/2015 | Hartmann | ............ | H04N 23/635 |
| | | | | | 348/148 |
| 2019/0266418 | A1* | 8/2019 | Xu | ........................ | G06V 10/764 |
| 2020/0116497 | A1 | 4/2020 | Jiang | | |

FOREIGN PATENT DOCUMENTS

CN 108431549 A 8/2018

OTHER PUBLICATIONS

Evaluating State-of-the-art Object Detector on Challenging Traffic Light Data.
Enhanced Detection and Recognition of Road Markings Based on Adaptive Region of Interest and Deep Learning.
Office Action from Indian Patent Office for a corresponding Indian patent application.

\* cited by examiner

*Primary Examiner* — Nancy Bitar
(74) *Attorney, Agent, or Firm* — Harvest IP Law, LLP

(57) ABSTRACT

The present disclosure discloses systems and method for real-time continuous lane mapping. The technique comprising receiving an input image of a road captured by an image sensor mounted on a vehicle; extracting one or more feature vectors from the image; extracting lane mark coefficients and lane type features from the one or more extracted feature vectors; detecting a lane mark by computing the coefficients and applying a pre-learned value; comparing the lane type relating to right and/or left lane markings with a predefined lane class; classifying the left and/or right lane markings based on the comparison and applying a pre-learned value; and generating a lane map along with the lane markings. The step of the lane detection and the classification is performed simultaneously based on the one or more extracted feature vectors.

19 Claims, 15 Drawing Sheets

FIG. 7
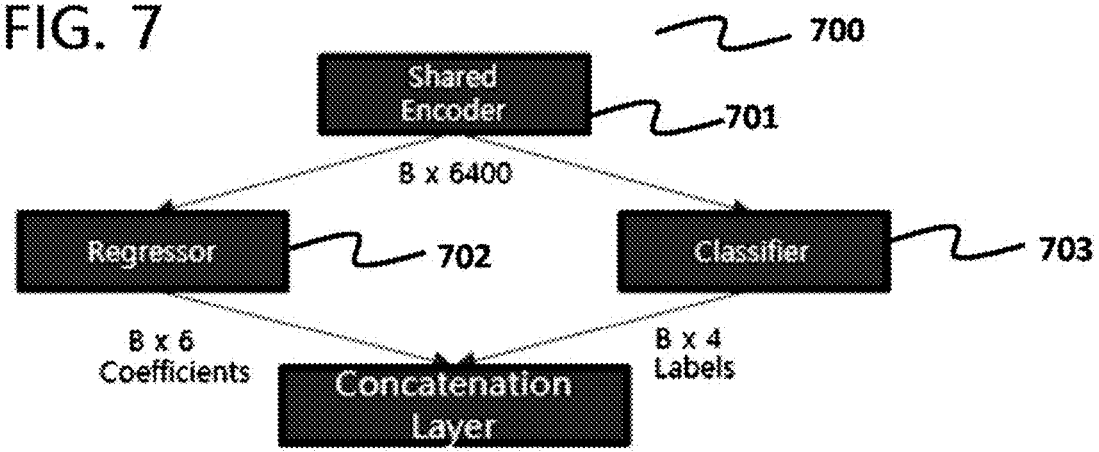
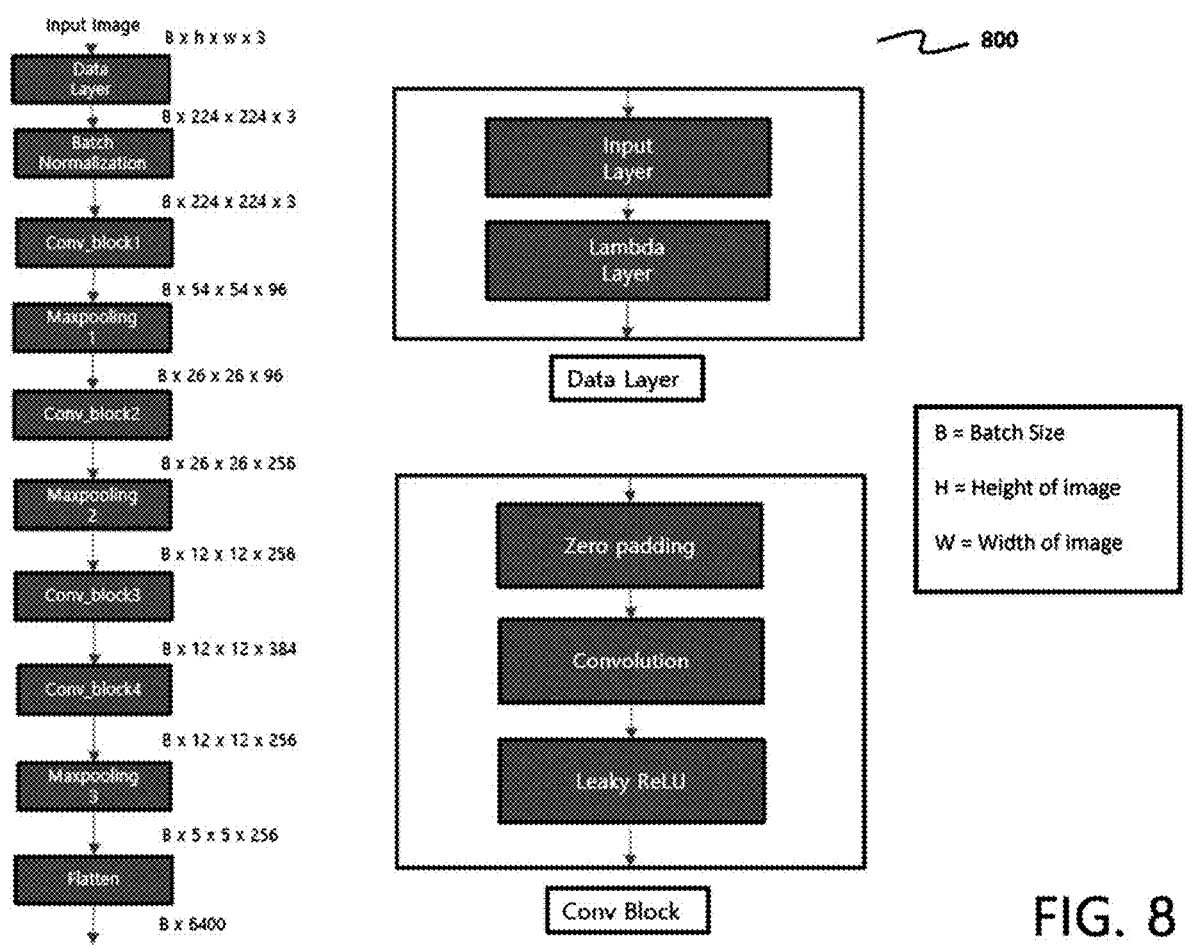
FIG. 8

FIG. 14C
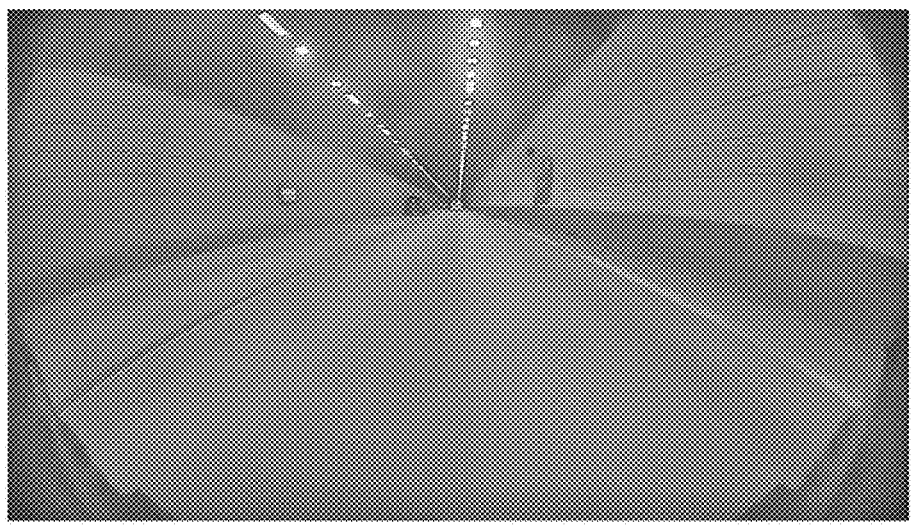
Rain Case
FIG. 15A
Road Characters
FIG. 15B Tunnel Case

METHOD AND SYSTEM FOR REAL-TIME CONTINUOUS LANE MAPPING AND CLASSIFICATION

CROSS-REFERENCE TO RELATED APPLICATION

This application claims priority to and the benefit of India Patent Application No. 202011052696, filed on Dec. 3, 2020, the disclosure of which is incorporated herein by reference in its entirety.

TECHNICAL FIELD

The present disclosure relates to field of autonomous driving. More particularly, the present disclosure relates to lane detection and classification for real-time continuous lane mapping.

BACKGROUND

Autonomous Driving Vehicles rely heavily on location of lanes for successful control and navigation over roads. Of particular importance to the successful control and navigation of the autonomous vehicles over roads is the ability to identify boundaries and area of traffic lanes. Apparently, among the complex and challenging tasks of such road vehicles is road lane detection or road boundaries detection and classification of lanes since driving constraints change with respect to the class of the lane.

During the driving operation, humans use their optical vision for vehicle maneuvering, while autonomous vehicles use computer vision techniques for their operations. Comparatively, it's easy for humans to find the location of the lanes on roads whereas it is a difficult task for a computer vision system where lane detection is a crucial step in decision making while an autonomous vehicle operates. While traffic lanes are usually delineated by simple lines and patterns, it is often difficult in practice for autonomous vehicle driving systems to identify lane boundaries due to road deterioration in a quick time, lighting conditions, rain, and similarity with other objects and patterns that may be found in a traffic scene, such as other vehicles or road-side structures.

There are two major metrics in the evaluation for a lane detection system, namely, Speed and Accuracy. Real-time decisions need to be made with high accuracy for it to steer properly. Wrong lane detections can lead to fatal accidents in the real-world scenario. The existing techniques disclose heuristics, which are followed by post-processing techniques to identify lane segments. However, such heuristics and post-processing techniques are not only expensive, but also fail to identify lane segments when variations in road scene occurs. Also, the existing solutions are not suitable for shorter range of FOV and lacks speed and accuracy required for lane detection and classification. Further, the existing solutions may fail to identify lane segments in inclement weather conditions like rainy and snow scenarios where rain blobs or snow blobs obstruct the view of the lane.

Therefore, it is highly desirable to provide an efficient real-time continuous lane mapping technique with higher accuracy.

SUMMARY OF THE INVENTION

One or more shortcomings of the prior art are overcome, and additional advantages are provided by the present disclosure. Additional features and advantages are realized through the techniques of the present disclosure. Other embodiments and aspects of the disclosure are described in detail herein and are considered a part of the disclosure.

It is to be understood that the aspects and embodiments of the disclosure described above may be used in any combination with each other. Several of the aspects and embodiments may be combined together to form a further embodiment of the disclosure.

In an aspect, the present disclosure provides a method for real-time continuous lane mapping for a host vehicle. The method comprising steps of: receiving an input image of a road captured by an image capturing device mounted on the host vehicle; extracting one or more feature vectors from the image; extracting lane mark coefficients and lane type features from the one or more extracted feature vectors; detecting a lane mark by computing the coefficients and applying a pre-learned value; comparing the lane type relating to right and/or left lane markings with a predefined lane class; classifying the left and/or right lane markings based on the comparison and applying a pre-learned value; and generating a lane map along with the lane markings; wherein, the step of the lane detection and the classification is performed simultaneously based on the one or more extracted feature vectors.

In another aspect, the present disclosure provides a method, wherein the input image may be a Ground Truth (GT) image generated from an original image using a lane labeler tool.

In another aspect, the present disclosure provides a method, wherein the input image may be an RGB image that comprises scene covered in a FOV of the image sensor configured to capture front view from the host vehicle In another aspect, the present disclosure provides a method, wherein the lane mark coefficients may comprise coefficients for representing a curvature of the road.

In another aspect, the present disclosure provides a method, wherein the lane type features may comprise a lane boundary, a starting position, a direction, grey-level intensity features, edge orientations, a shape, a position of an object in the image, an aspect ratio that are implicitly learned and modelled in a deep learning system.

In yet another aspect, the present disclosure provides a method, wherein the lane mark may comprise a dotted lane type, a solid lane type, lane color and road characters.

In yet another aspect, the present disclosure provides a method, wherein the extracting lane mark coefficients and lane type features may further comprise distinguishing a lane mark from objects present/drawn on the road.

In another aspect, the present disclosure provides a method, wherein generating a lane map along with lane markings may further comprise concatenating steps of the lane detection and the classification; and plotting the lane map in real time on a display.

In an aspect, the present disclosure provides a system for real-time continuous lane mapping for a host vehicle. The system comprises an image sensor configured to capture an image of a road; and a controller communicatively connected to the image sensor and configured to: receive an input image of a road captured by the image capturing device; extract one or more feature vectors from the image; extract lane mark coefficients and lane type features from the one or more extracted feature vectors; detect a lane mark by computing the coefficients and applying a pre-learned value; compare the lane type relating to right and/or left lane markings with a predefined lane class; classify the left and/or right lane markings based on the comparison; and generate a lane map along with the lane markings; wherein, the controller is configured to simultaneously detect and classify the lane based on the one or more extracted feature vectors.

In another aspect, the present disclosure provides a system, wherein the controller may be further configured to detect the lane mark coefficients comprising coefficients for representing a curvature of the road.

In yet another aspect, the present disclosure provides a system, wherein the controller may be further configured to detect a lane boundary, a starting position, a direction, grey-level intensity features from the lane type features, edge orientations, a shape, a position of an object in the image, an aspect ratio that are implicitly learned and modelled in a deep learning system.

In another aspect, the present disclosure provides a system, wherein the controller may be further configured to identify the lane mark based on a dotted lane type, a solid lane type, a lane color and road characters.

In another aspect, the present disclosure provides a system, wherein the controller may be further configured to concatenate the lane detection and the classification to generate the lane map along with lane markings, and plot the lane map along with the lane markings in real time.

In an aspect, the present disclosure provides a non-transitory computer-readable medium. The medium comprising computer-readable instructions for real-time continuous lane mapping for a host vehicle, when executed by a host vehicle, causes a processor to: receive an input image of a road captured by an image sensor mounted on the host vehicle; extract one or more feature vectors from the image; extract lane mark coefficients and lane type features from the one or more extracted feature vectors; detect a lane mark by computing the coefficients and applying a pre-learned value; compare the lane type relating to right and/or left lane markings with a predefined lane class; classify the left and/or right lane markings based on the comparison; and generate a lane map along with the lane markings; wherein, the lane detection and the classification is performed simultaneously based on the one or more extracted feature vectors.

In another aspect, the present disclosure provides a computer-readable medium, which may further comprise instructions that cause the processor to detect the lane mark coefficients further comprising coefficients for representing a curvature of the road.

In another aspect, the present disclosure provides a computer-readable medium, which may further comprise instructions that cause the processor to detect a lane boundary, a starting position, a direction, and grey-level intensity features from the lane type features from the lane type features, edge orientations, a shape, a position of an object in the image, an aspect ratio that are implicitly learned and modelled in a deep learning system.

In another aspect, the present disclosure provides a computer-readable medium, which may further comprise instructions that cause the processor to identify lane mark based on a dotted lane type, a solid lane type, a lane color and road characters.

In yet another aspect, the present disclosure provides a computer-readable medium, which may further comprise instructions that cause the processor to concatenate the lane detection and the classification to generate the lane map along with lane markings.

In yet another aspect, the present disclosure provides a computer-readable medium, which may further comprise instructions that cause the processor to plot the lane map along with the lane markings in real time.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 7 illustrates an overview of model architecture according to an aspect of the present disclosure.

FIG. 8 illustrates an architecture of a shared encoder according to an aspect of the present disclosure.

FIGS. 14a-c illustrates different scenarios for handled by the real-time continuous lane mapping system according to an aspect of the present disclosure.

FIGS. 15a-c illustrates lane maps produced in different challenging cases illustrated in FIG. 14a-c by the real-time continuous lane mapping system according to an aspect of the present disclosure.

DETAILED DESCRIPTION

Figure 1:
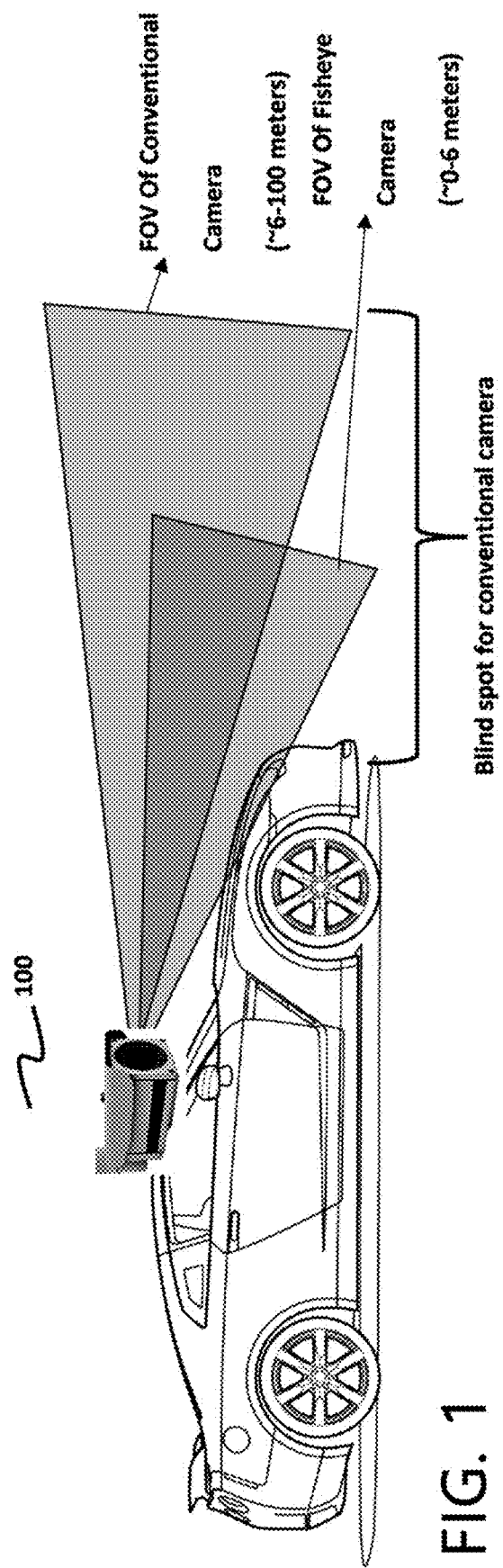
FIG. 1 illustrates blind spot for conventional camera in existing computer visions systems of autonomous vehicles as compared to a camera disclosed in the present disclosure.

Referring in the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus or device. It could be noted with respect to the present disclosure that the terms like "a system for real-time continuous lane mapping", "the system" are interchangeably used throughout the description and refer to the same system. Similarly, terms like "Autonomous Driving Vehicles", "autonomous vehicles", are interchangeably used throughout the description.

Disclosed herein are the techniques for real-time continuous lane mapping. In an exemplary embodiment of the present disclosure, an image capturing device is mounted on a vehicle, preferably at bumper of the vehicle, but not limited thereto. As an example, the image capturing device may include, but not limited to a fisheye camera which provides a wider Field of View (FOV). The fish-eye camera continuously captures an image of a road and sends these images for further processing. For example, the images captured by the camera is provided to a lane detection and a classification system. The system extracts required features from the image and performs the lane detection and the classification simultaneously based on the extracted features.

This achieves advantages with respect to an accuracy and a speed and contributes to efficient and robust real time lane mapping. The present disclosure achieves these advantage(s) in a manner as described below with respect to the drawings.

FIG. 1 illustrates a blind spot for conventional camera as compared to a fish-eye camera used in the present disclosure. As already indicated in the background section, the conventional camera has a higher Field of View (FOV) i.e., —6-100 meters restricting it to perceive—6 meters directly ahead of the vehicle which is crucial for any lane detection system. The area not perceivable by conventional cameras is known as the blind spot. The fisheye camera is able to avoid this problem as it can perceive the area in the blind spot making it favorable for real time lane mapping systems. The Fisheye camera can be used in both cases where lower FOV is required and also where higher FOV is required that eliminates the use of multiple cameras for different cases. Although, the fish-eye camera is preferable for image capturing in the present disclosure, however, it may be noted that any other such camera or sensing device that fulfills desired requirement of the present disclosure may be used for image capturing.

Figure 2:
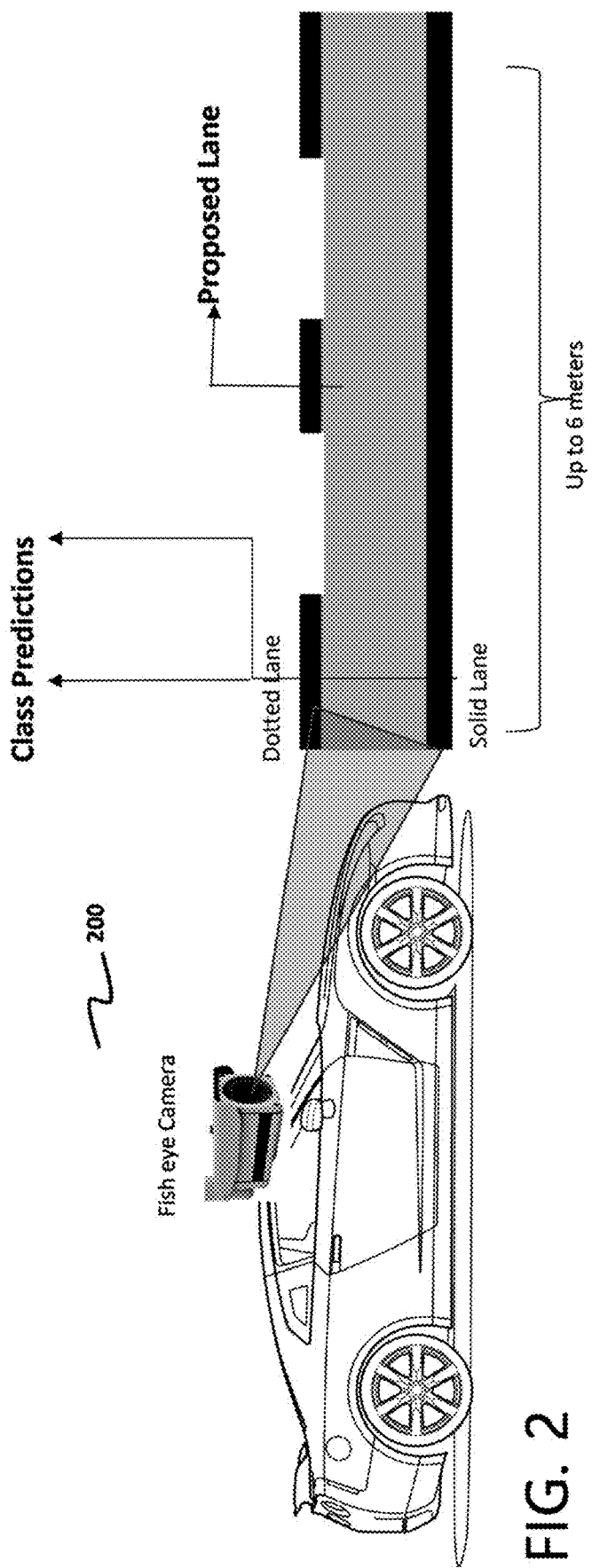
FIG. 2 illustrates lane detection using the camera according to an aspect of the present disclosure.

FIG. 2 illustrates real time lane mapping using fisheye camera according to an embodiment of the present disclosure. The present disclosure provides a computationally efficient and optimized design for detecting and classifying the lanes using a fish-eye camera's frontal view in vehicles. The fish-eye camera captures images with a length of view up to 6 meters. The system predicts three coefficients namely a, b, c and n class probabilities in an end-to-end model. The end-to-end model specifies that the lane detection and the classification are performed simultaneously and thus avoids a post processing. This makes the whole system computationally efficient with an optimized design.

The present disclosure uses Deep Learning based approach that makes the inference faster with respect to other conventional computer vision approaches. A coefficient based lane detection method requires no post processing and can be directly used for decision making in autonomous vehicles due to its mathematical equation-like output. The whole process is end-to-end and thus provides results in real time. Using three coefficients for each lane totaling to six coefficients the system forms the quadratic curve. Then, the equation and the classes are used to plot the output on the image. The lane detection algorithm uses the fish eye images to predict a parabolic equation defined as: $ax^2+bx+c=y$ and the consecutive classes for both of the lanes. The system is able to classify both the lanes by the camera into various classes. For example—a solid lane, a dotted lane, etc.

Figure 3:
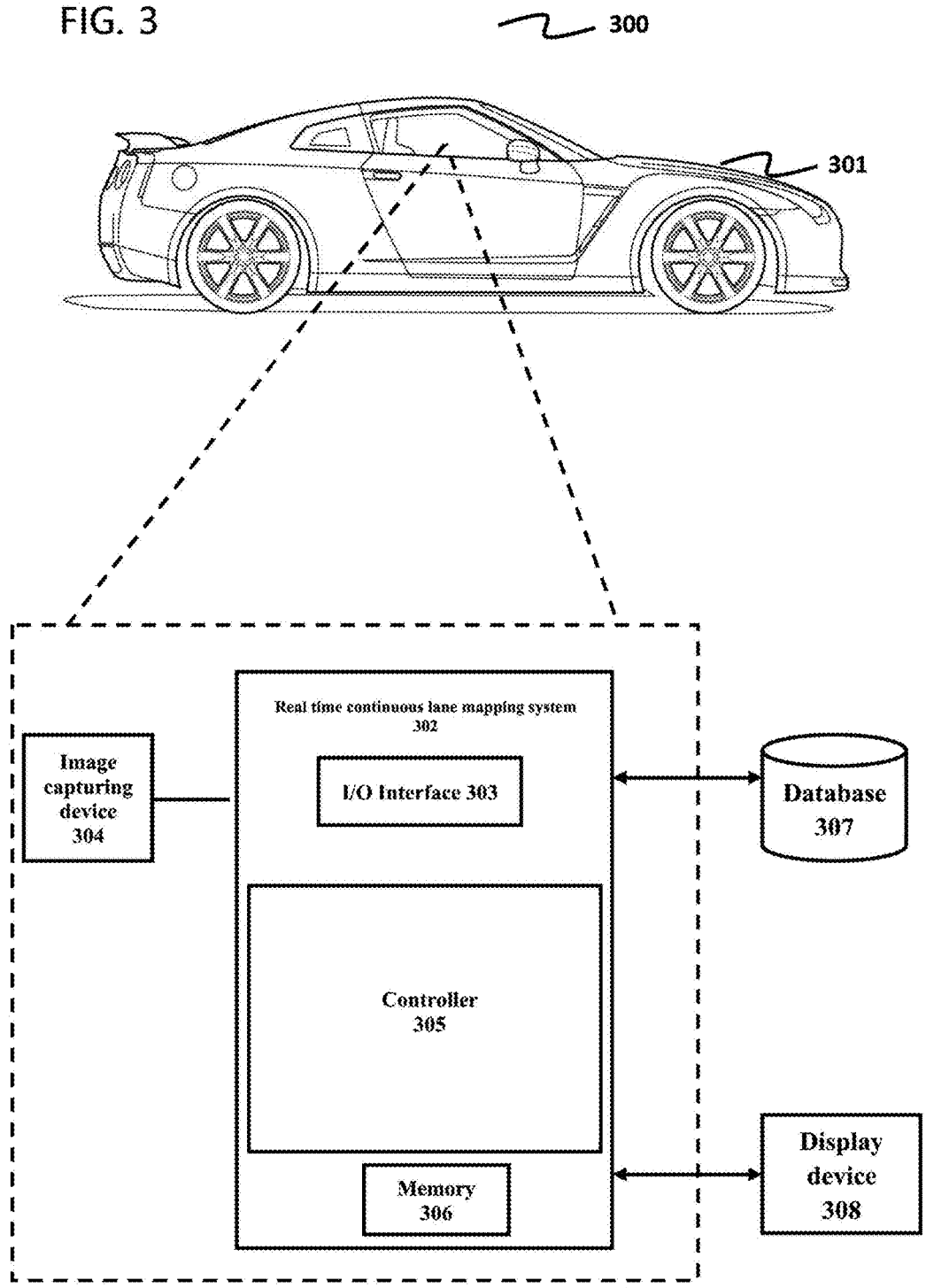
FIG. 3 shows an exemplary architecture for detecting lane pattern in accordance with an aspect of the present disclosure.

FIG. 3 shows an exemplary architecture for detecting and a classification of a lane in accordance with some embodiments of the present disclosure.

The architecture 300 comprises a vehicle 301, a real time continuous lane mapping system 302 and a display device 308. As an example, the vehicle 301 may be a car, a truck, a bus, and the like. Input images captured by an image capturing device 304 configured on the vehicle 301 and provided to the real time continuous lane mapping system 302. As an example, the image capturing device 304 configured on the vehicle 301, may access an image repository or a computing device such as a mobile, a desktop, a laptop and the like associated with the image capturing device. As an example, the image capturing devices may include, but not limited to, a camera. In some embodiments, one or more image capturing devices may be configured at different positions on the vehicle 301. The preferred position is at the bumper of the device. The real time continuous lane mapping system 302 may be hosted on a server. In some embodiments, the server in which the real time continuous lane mapping system 302 is hosted may be a local server configured in the vehicle 301 as shown in the FIG. 3. In some other embodiments, the server in which the real time continuous lane mapping system 302 is hosted may be a remote server or a cloud server.

Further, the real time continuous lane mapping system 302 may include a controller 305, an Input/Output (I/O) interface 303 and a memory 306. The I/O interface 303 may receive an input image/training image from a data source among the one or more data sources. In some embodiments, the input image may be captured by the image capturing device 304 configured to capture a front view from the vehicle 301. In some embodiments, the training image may be a Ground Truth (GT) image comprising one or more lane markings and co-ordinates of the one or more lane markings. The input image received through the I/O interface 303 may be stored in the memory 306. Further, the I/O interface 303 may access a historical lane data stored in the database 307 associated with real time continuous lane mapping system 302. As an example, the historical lane data may include, but not limited to, lane patterns detected from previous images of lanes captured in real-time by the image capturing device. In some embodiments, the database 307 may further include, but not limited to, training images of the lanes captured in different weather conditions and light conditions, and other related image parameters. Further, controller 305 may extract all of the features or feature maps from the input image. These feature maps are flattened to form a feature vector. The controller 305 extracts lane mark coefficients and lane type features from the extracted features. The controller further detects a lane mark by computing the coefficients and applying a pre-learned value, compares the lane type relating to right and/or left lane markings with a predefined lane class. Based upon this comparison, the controller 305 classifies left and/or right lane markings and applying a pre-learned value stored in the memory 306 and generates a lane map along with lane markings. It may be worth noted that the classification and the detection of lanes is performed simultaneously by the controller 305 based on the historical lane data, using a trained machine learning model.

As an example, the trained machine learning model may detect the lane pattern under various conditions such as noisy conditions occurring due to a presence of dust/water on the image capturing device, due to rain and the like, varying illumination conditions due to shadows of surrounding objects, tunnels, weather conditions and the like. Further, in some embodiments, the detected lane pattern may be displayed using the display device 308 associated with the system 302. In some embodiments, the detected lane pattern may be displayed on an original image, from which the GT image was generated. As an example, the detected lane pattern is a solid lane. The controller 305 may display a phrase "solid lane" on the corresponding lane in the original image.

Figure 4:
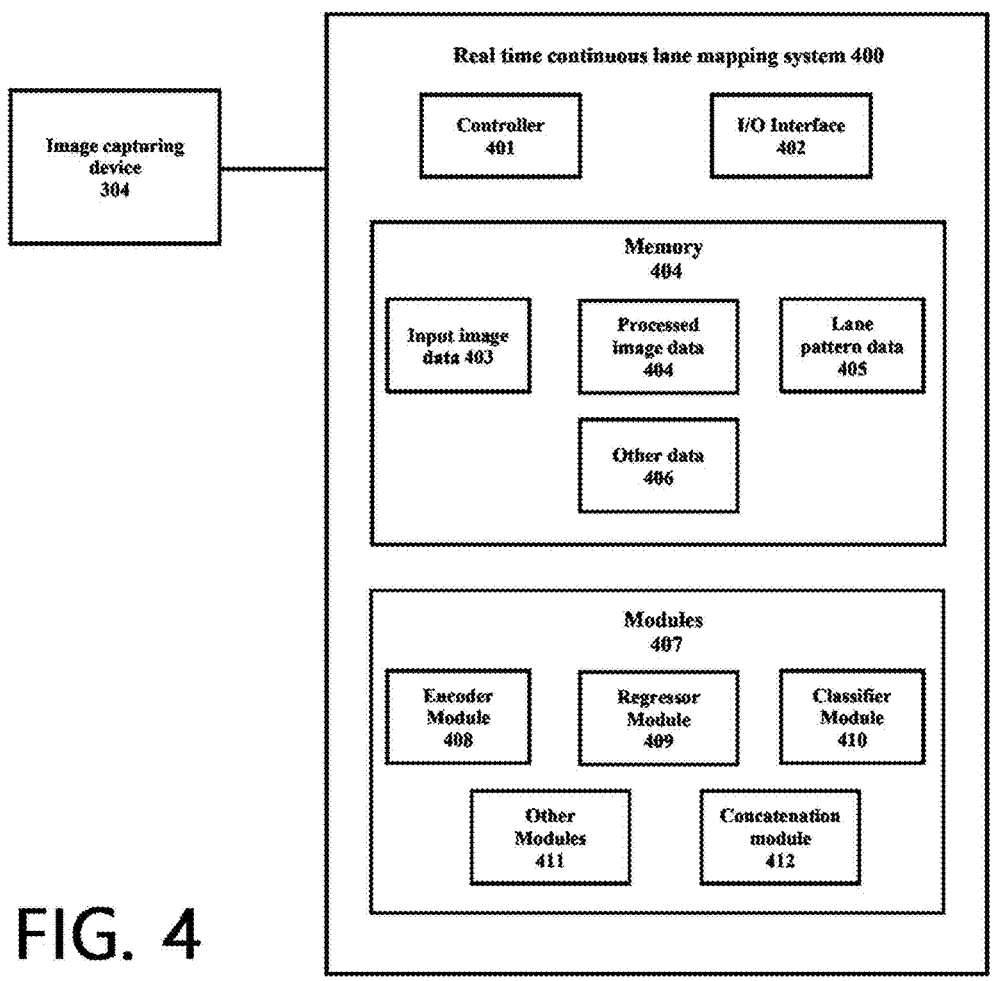
FIG. 4 shows a detailed block diagram of the real time continuous lane mapping system in accordance with an aspect of the present disclosure.

FIG. 4 shows a detailed block diagram of the real time continuous lane mapping system in accordance with some embodiments of the present disclosure.

In some implementations, the real time continuous lane mapping system 400 may include data and modules 407. As an example, the data may be stored in a memory 404 configured in the real time continuous lane mapping system 400. In one embodiment, the data may include an input image data 403, a processed image data 404, a lane pattern data 405 and other data 406.

In some embodiments, the data may be stored in the memory 404 in form of various data structures. Additionally, the data can be organized using data models, such as relational or hierarchical data models. The other data 406 may store data, including a temporary data and temporary files, generated by the modules 407 for performing the various functions of the real time continuous lane mapping.

In some embodiments, the data stored in the memory may be processed by the modules 407 of the real time continuous lane mapping system 400. The modules 407 may be stored within the memory 404. In an example, the modules 407 communicatively coupled to the controller 401 configured in the real time continuous lane mapping system 400, may also be present outside the memory 404 as shown in FIG. 4 and implemented as hardware. As used herein, the term modules 407 may refer to an application specific integrated circuit (ASIC), an electronic circuit, a processor (shared, dedicated, or group), a controller and memory that execute one or more software or firmware programs, a combinational logic circuit, and/or other suitable components that provide the described functionality.

In some embodiments, the modules 407 may include, for example, a encoder module 408, a regressor module 409, a classifier module 410, a concatenation module 412 and other modules 411. The other modules 411 may be used to perform various miscellaneous functionalities of the real time continuous lane mapping system 400. It will be appreciated that such aforementioned modules 407 may be represented as a single module or a combination of different modules.

In some embodiments, the encoder module 408 may receive an input image from the image capturing device. The input image thus received may be stored as the input image data 403.

In some embodiments, the input images captured by the image capturing device configured on the vehicle 301 are provided to the real time continuous lane mapping system 400. As an example, input images may be provided by, for example, the image capturing device configured on the vehicle 301.

As previously discussed, in some embodiments, the training image is a Ground Truth (GT) image comprising one or more lane markings and co-ordinates of the one or more lane markings. The GT image may be generated from the input image captured by the image capturing device using any available lane labeler tool. In some embodiments, the input image may be an RGB image that may include scene covered in the FOV of the image capturing device configured to capture the front view from the vehicle 301. The different modules/units are now described in detail in FIGS. 5-15.

Figure 5:
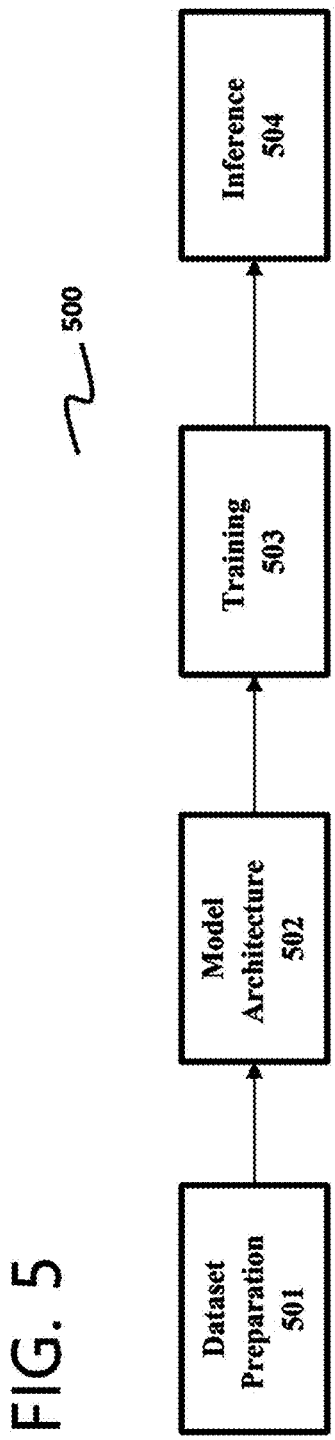
FIG. 5 illustrates a multi-step process to achieve real-time continuous lane mapping according to an aspect of the present disclosure.

FIG. 5 illustrates a complete multi-step process 500 to achieve a real-time continuous lane mapping according to an embodiment of the present disclosure. The various steps involved are namely, a data set preparation 501, a model architecture 502, a training phase 503 and an inference 504. Each of these steps/blocks are discussed in later drawings.

Figure 6:
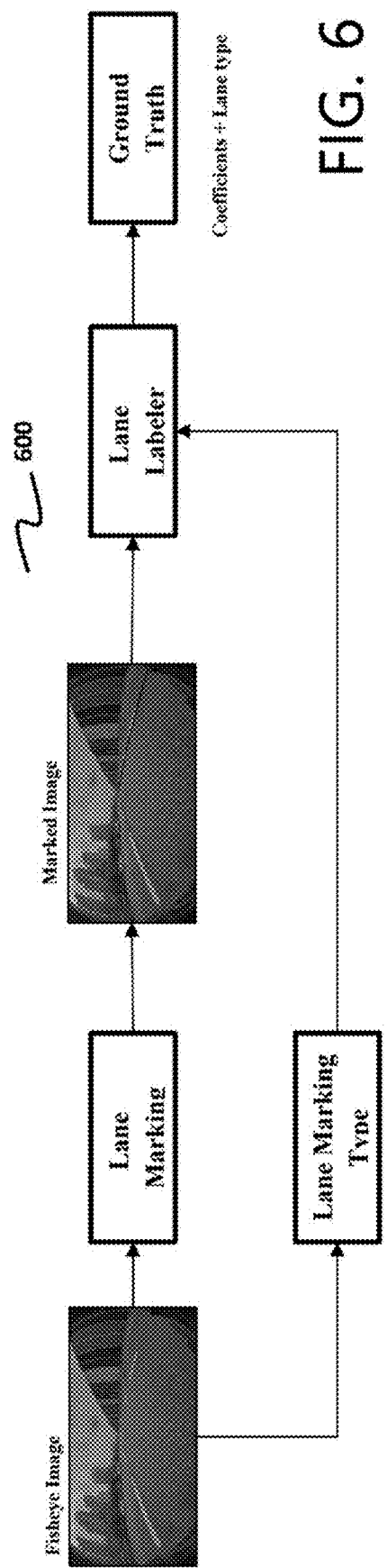
FIG. 6 illustrates a block diagram of dataset preparation according to an aspect of the present disclosure.

FIG. 6 illustrates a block diagram of dataset preparation 600 (501 of FIG. 4) according to an embodiment of the present disclosure. In an exemplified embodiment of the present disclosure, the dataset preparation is done using the fisheye camera lens installed on the vehicle. After capturing the images, lane markings and type of lane markings is done using a Lane Labeler tool. The left and right lanes are accordingly marked by different colors in a marked image as shown in FIG. 6. Thus, a GT image is obtained.

FIG. 7 illustrates an overview of model architecture 700 (502 of FIG. 4) according to an embodiment of the present disclosure. In an exemplary embodiment, the model architecture 700 consists of three major components namely, a shared encoder 701, a regressor 702 and a classifier 703. The first layer of the model architecture is a Lambda Layer which allows for variable size input image. The architecture runs on a 224×224 resolution image. The shared encoder 701 is a convolutional neural network model, which extracts the feature maps from the image. The feature maps are flattened to form a feature vector. The feature vector from the shared encoder 701 is then passed to the regressor (or a regressor unit) 702 and the classifier (or a classifier unit) 703 to make coefficient and class predictions, the regressor 702 is used to predict the coefficients which are continuous variables and the classifier 703 predicts class probabilities which are discreet variables related to lane. A Leaky Rectified Linear Unit (ReLU) activation layer is used as a non-linearity function aided in improving the results. Leaky ReLU function is an upgrade from ReLU which is able to calculate gradients in the negative region of the graph. The shared encoder 701 has various layers connected in serial. The shared encoder 701 extracts feature from the image which are common to both the classifier 702 and the regressor 703.

FIG. 8 illustrates an architecture of the shared encoder 800 according to an embodiment of the present disclosure. The shared encoder is used for extraction of features information such as texture, color, edges etc. that is essential for the detection and the classification of lanes and shared for both operations. In the architecture of shared encoder, B is a batch size, H is a height of the image and W is a width of the image. The architecture of shared encoder consists of following blocks:

- Data Layer: Data layer is used to interface the data with the model architecture. It consist of two layers, an input layer which receives the data (i.e. Image) and stored it to memory and a Lambda layer which resizes the image of any size to (B×224×224×3) which is required by a model.
- Batch Normalization: This layer is used to normalize the data so that the effect of covariate shift can be reduced.
- Cony Block: This block is responsible for learning the features. It consists of three sub-blocks. A zero padding is used for adding extra pixels to the boundary of image so that the size of a input and a output to a convolution would be same. A convolution block contains a learnable parameter and their value is adjusted during training and used to extract features.
- Leaky Relu: Leaky Relu is used as non-linear activation function which adds non-linearity to otherwise linear blocks of the architecture. Thus cony block is able to learn complex features.
- Max pooling block: This layer is used to retrieving contextual information from the intermediate feature maps by taking out maximum values and reduces the size of feature maps thus complexity of the model.
- Flatten Layer: This layer is used to make 2D feature maps to a 1D vector which makes it compatible to be passed in feedforward neural network.

Figure 9:
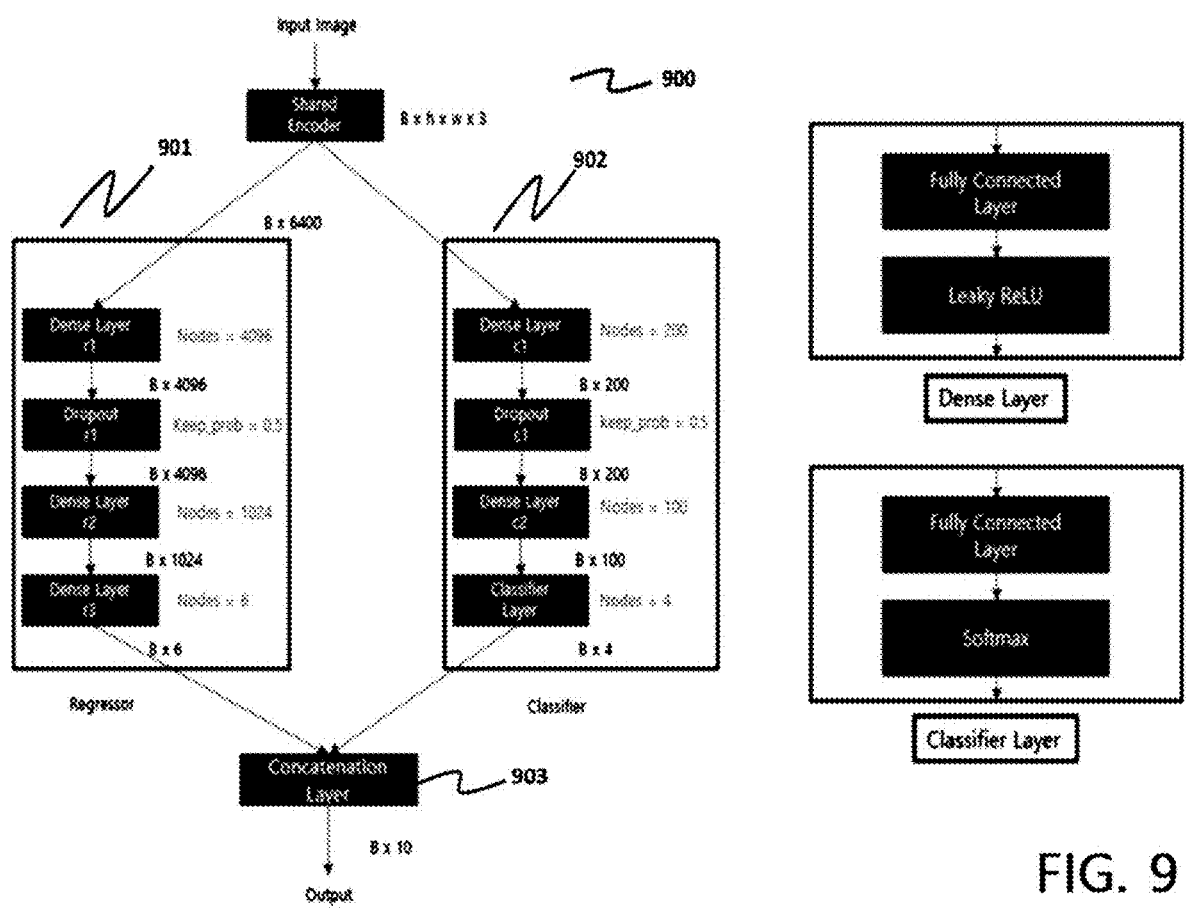
FIG. 9 illustrates a detailed model architecture according to an aspect of the present disclosure.

FIG. 9 illustrates a detailed model architecture 900 according to an embodiment of the present disclosure. This architecture provides a detailed view of a regressor unit 901 and a classifier unit 902. In an exemplary embodiment, after extracting features from the shared encoder, this information is used to detect and classify the lanes. The regressor unit 901 is responsible for detecting the position of lanes by giving 6 coefficients, 3 for each lane and the classifier unit 902 classifies the lanes whether solid, dotted etc. The model architecture performs simultaneous detection and classification of lanes.

Regressor 901:

The main function of this block is to learn the transformation of features containing an information about the position of lanes to mathematical quantities which are coefficients. According to an exemplary aspect of the present disclosure, lanes are modeled, for example, as second-degree polynomial curve (a*x*x+b*x+c) where a, b, c are the coefficients. As this transformation requires lots of computation, a Dense layer is used, which is made up of neurons, which receives inputs and calculates output as $\{y=f(W*x+B)\}$, wherein:

- x—represents an Input vector
- y—represents an Output vector
- W, B—represents Weights and bias (these are the parameters which the model learns during training phase)
- f( )—represents a Non-linear function Leaky Relu (to add non-linearity to linear computation so that the regressor can learn non-linear transformation)

In addition to above, a dropout layer is used which is a sort of a regularization that is used to stop overfitting. Finally, a last dense layer gives contains 6 neurons nodes to provide coefficients.

Classifier 902:

The main function of this block is to learn the classification on the basis of features extracted by shared encoder. The other layers used are Dense layer, Dropout layer as explained in the regressor used to convert features to a four-dimensional feature vector which represents the class of lanes. The number of nodes in the classifier is less than the regressor as the classification requires a less transformation as compared to the regression which extract an exact mathematical quantity. The classifier layer uses SoftMax non-linear activation function which gives joint probabilities for 4 output nodes and one with the maximum value taken as 1 and other are 0 and lanes are classified as:

[1,0,0,0]—Solid, Solid
[0,1,0,0]—Solid, Dotted
[0,0,1,0]—Dotted, Solid
[0,0,0,1]—Dotted, Dotted Further, a concatenation layer 903 is used to combine the result of both the regressor and the classifier.

Figure 10:
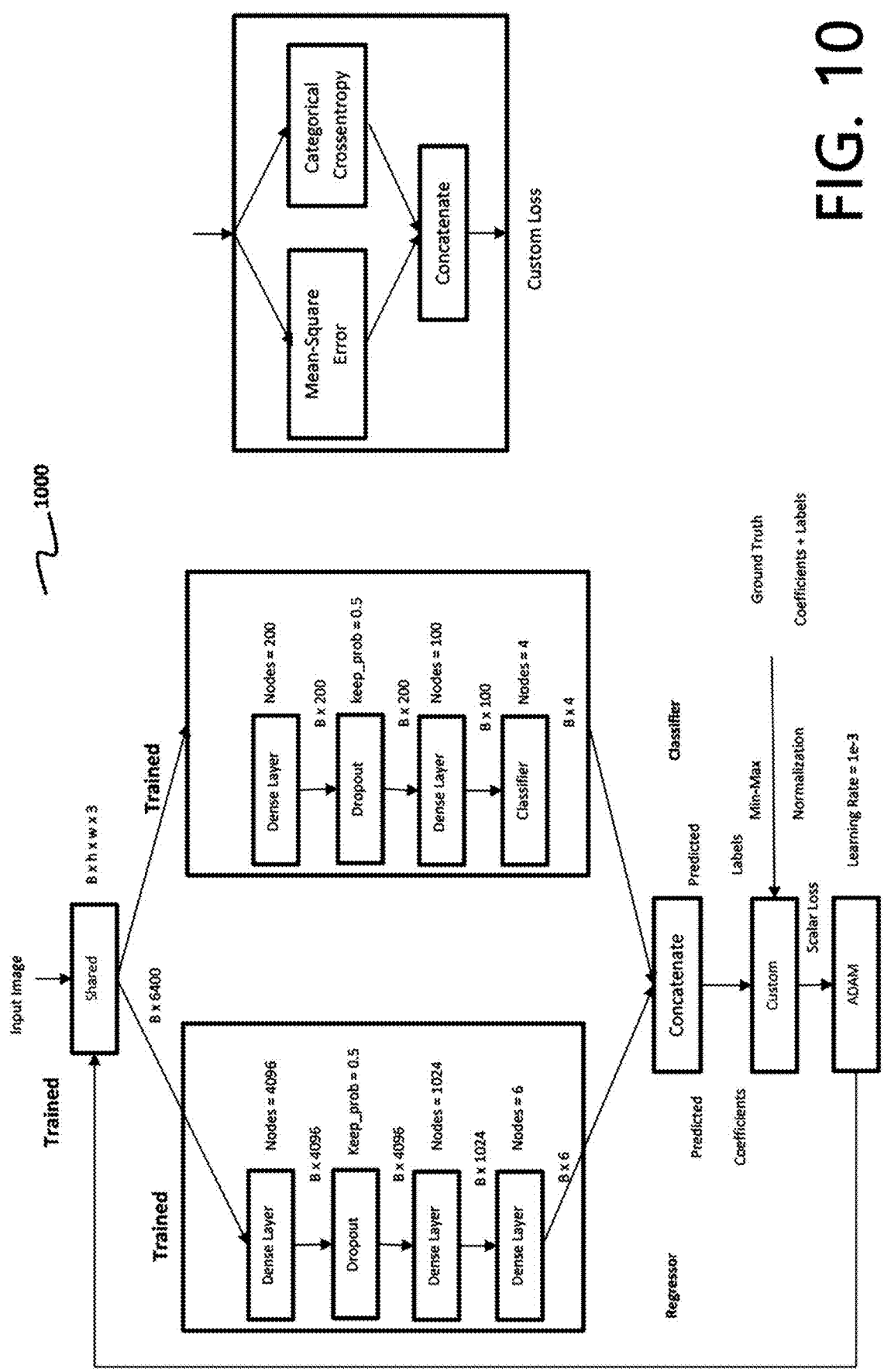
FIG. 10 illustrates a training process of complete architecture according to an aspect of the present disclosure.

FIG. 10 illustrates a training process 1000 of a whole architecture according to an embodiment of the present disclosure. In an exemplary embodiment, first of all, the complete architecture got trained on a respective ground truth so that parameters of the shared encoder got adjusted and it is able to extract the useful features for the detection and the classification tasks. The architecture is trained with all the shared encoder, the regressor and the classifier part trainable with a custom loss which comprises a combination of Mean square error and a categorical cross entropy loss. After training the whole architecture, the next step is to finetune the regression branch and the classifier branch separately.

Figure 11:
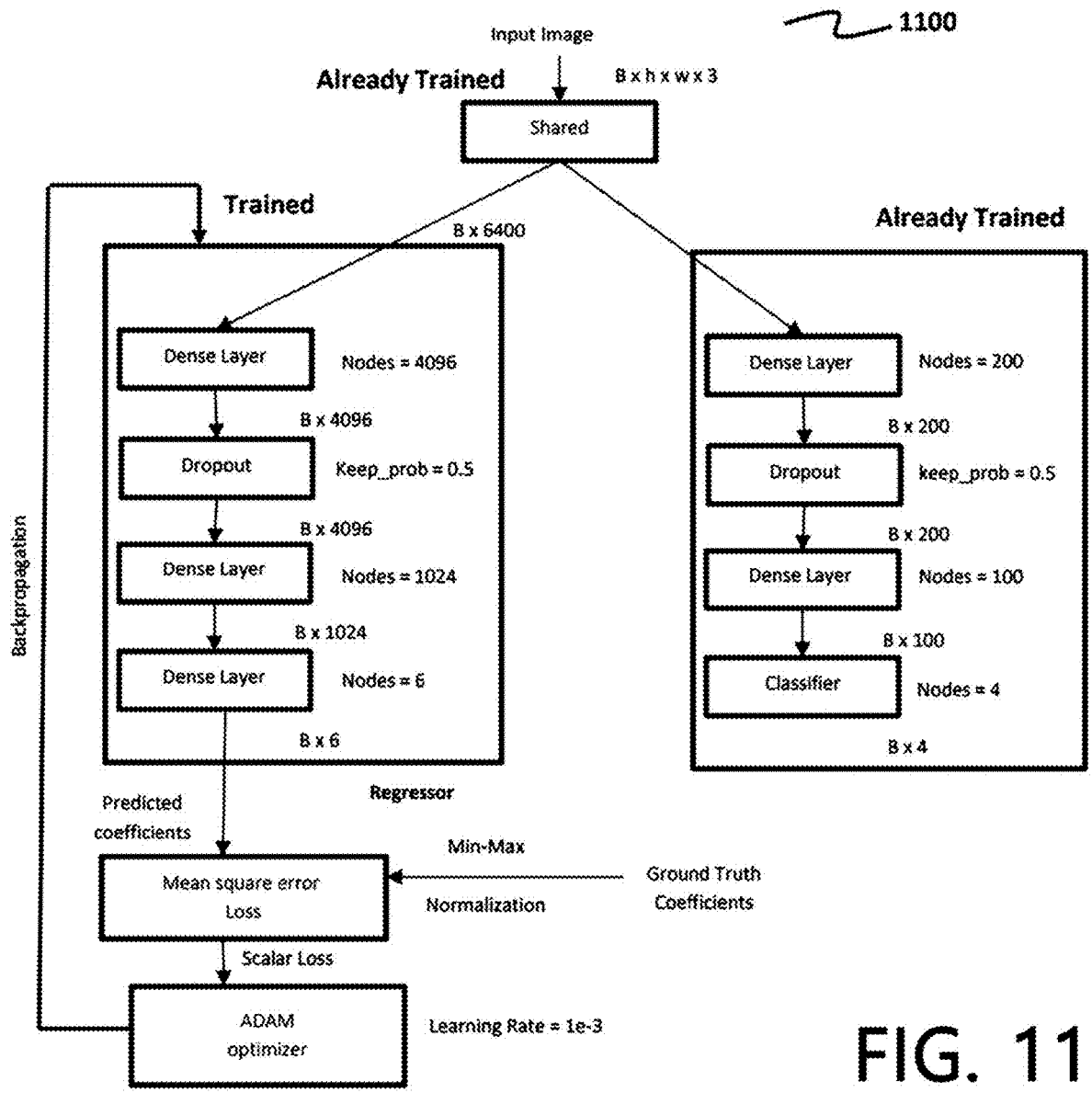
FIG. 11 illustrates a training process of a regressor of the architecture according to an aspect of the present disclosure.

FIG. 11 illustrates a training process of a regressor of the architecture according to an embodiment of the present disclosure. In this process, the regression branch is finetuned. In this step, the shared encoder and the classifier part is freezed. Only regression branch is trainable which is trained by the categorical cross entropy loss using ADAM optimizer. In an exemplary embodiment, $\frac{1}{3}^{rd}$ crop of the image is used to provide less weightage to the upper part of the image (usually sky part). This provides improved results as less data is required as compared to full image.

Figure 12:
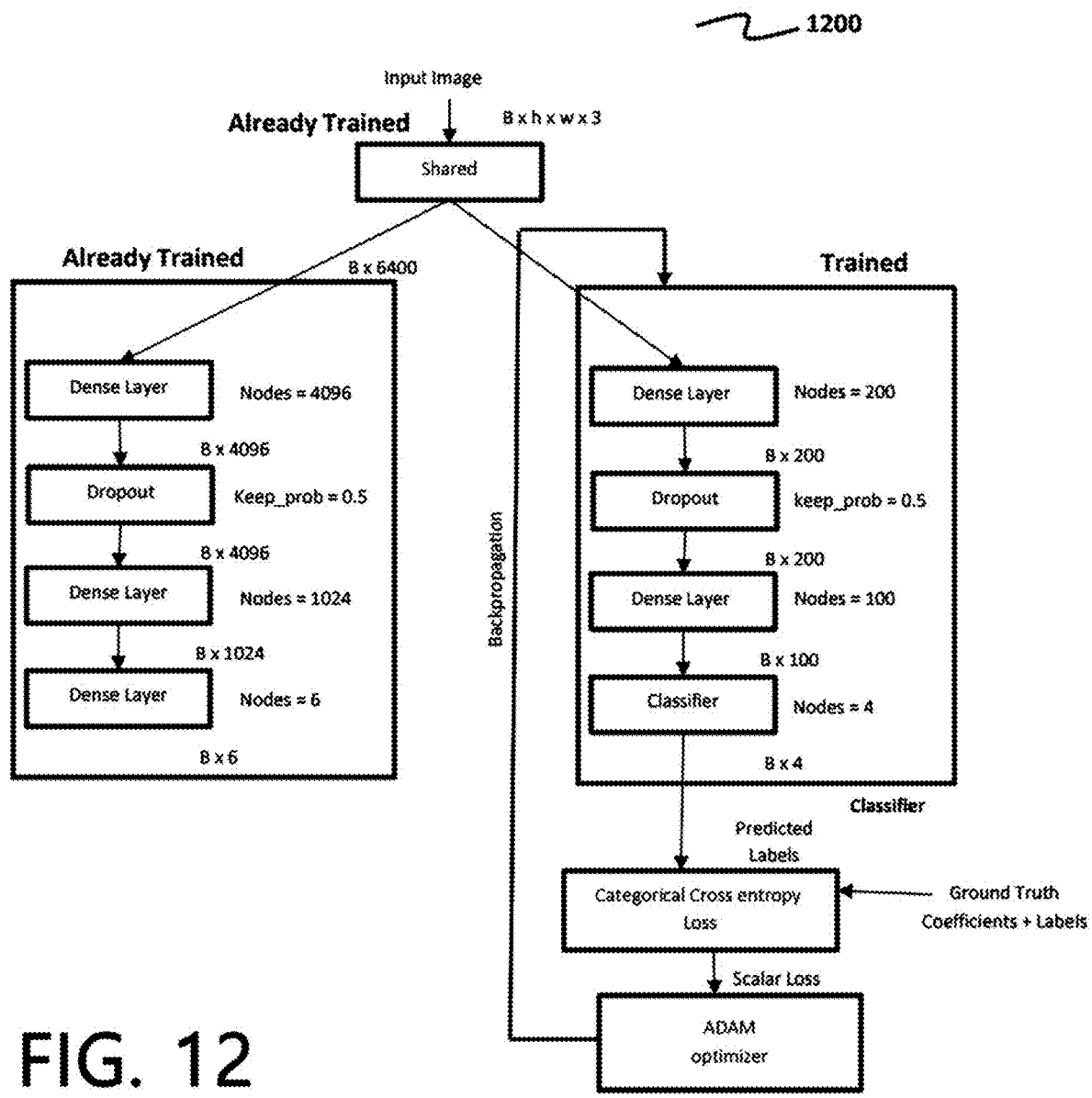
FIG. 12 illustrates a training process of a classifier of the architecture according to an aspect of the present disclosure.

FIG. 12 illustrates a training process of a classifier of the architecture according to an embodiment of the present disclosure. After that, the classifier branch is finetuned and the shared encoder and the regressor got freezed. The classifier is trained using a categorical cross entropy loss with ADAM optimizer. The model is trained with learning rate of 1e-3.

Training process as shown in FIGS. 11 and 12 comprises of passing the input samples to the architecture to which it output its prediction, which are 6 coefficients for the lane detection and 4 classification coefficients. Then these respected predictions get compared with ground truth via a loss function to measure how accurate the predictions and on the basis of an error which is back propagated so that the model can adjust its parameters for a better prediction next time.

For Regressor:

The Loss function used for the regressor is a mean square error loss and its ground truth comprises of the exact value of normalized 6 coefficients of polynomial modeled lanes. ADAM optimizer is used during training.

For Classifier:

The Loss function used for the classifier is the categorical cross entropy loss and ground truth comprises of the exact value of 4 binary values which represents classes in terms of one hot encoding. e.g. [1,0,0,0] for solid, solid lanes. ADAM optimizer is used during training.

Figure 13:
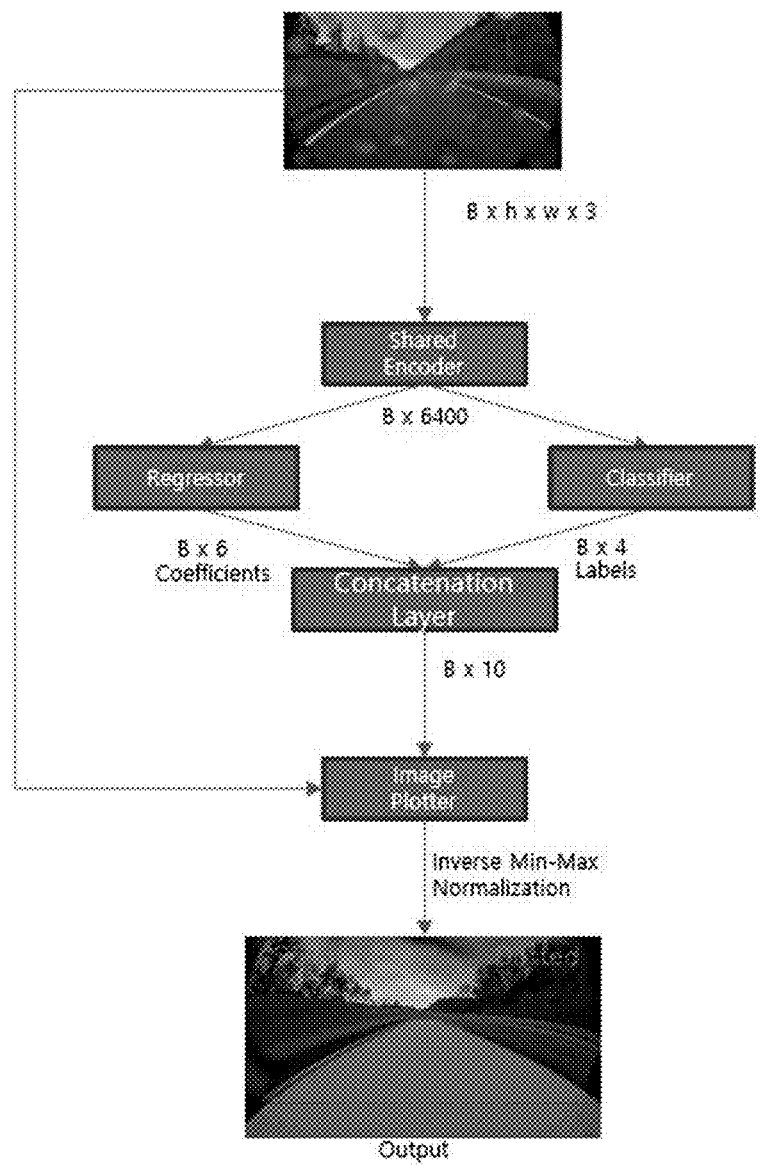
FIG. 13 illustrates an inference process of the architecture according to an aspect of the present disclosure.

FIG. 13 illustrates an inference process of the architecture according to an embodiment of the present disclosure. During the inference, loss layers are removed, and the image is fed to the shared encoder. The outputs from the classifier and the regressor are concatenated. The lane is plotted with the lane and lane types using the Image Plotter.

Figure 14A:
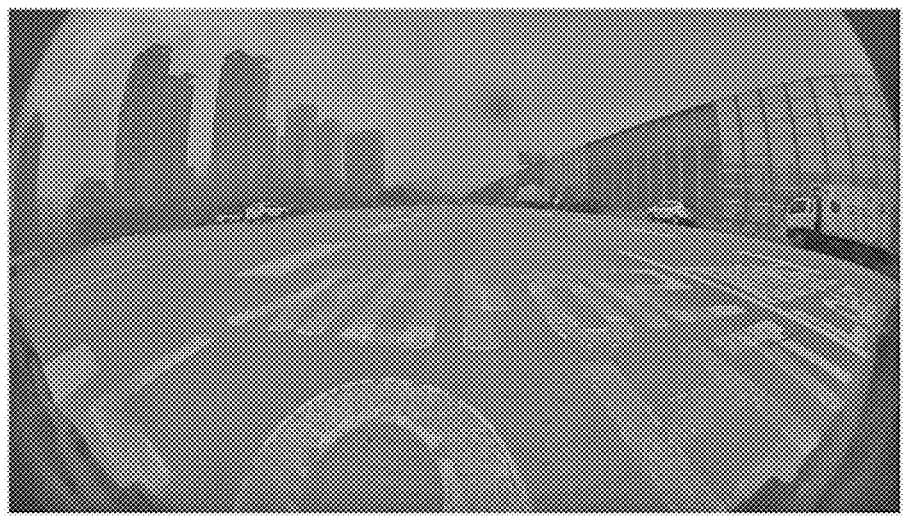
Figure 14B:

FIG. 14a-c illustrates different scenarios handled by the real-time continuous lane mapping system according to an embodiment of the present disclosure. For example, FIG. 14a represents an image taken by the camera wherein the road/lanes have different characters drawn on them. FIG. 14b represents an image of the road/lane taken on a rainy day. FIG. 14c represents an image of the road/lane taken inside a tunnel when the lane is not much visible.

Figure 15C:
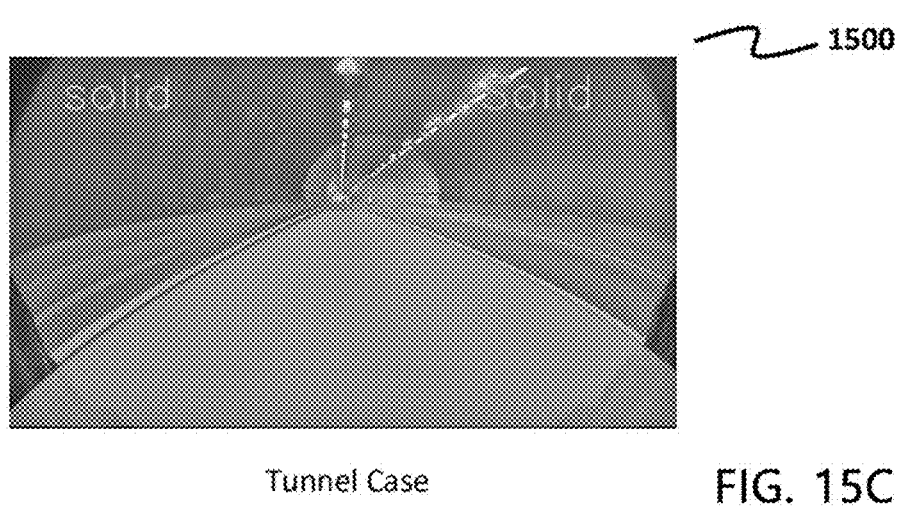

FIGS. 15a-c illustrates lane maps produced in different scenarios illustrated in FIGS. 14a-c by the real-time continuous lane mapping system according to an embodiment of the present disclosure. Thus, the present disclosure shows improved results on various scenarios including but not limited to, straight lane, curved lane, tunnel case, change in illumination case, rain images, road characters etc.

The foregoing description of the various embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein, and instead the claims should be accorded the widest scope consistent with the principles and novel features disclosed herein.

While the disclosure has been described with reference to a preferred embodiment, it is apparent that variations and modifications will occur without departing the spirit and scope of the disclosure. It is therefore contemplated that the present disclosure covers any and all modifications, variations or equivalents that fall within the scope of the basic underlying principles disclosed above.

We claim:

1. A method for real-time continuous lane mapping for a host vehicle, the method comprising steps of: receiving an input image of a road, in which the host vehicle drives, captured by an image sensor mounted on the host vehicle, the road defined at least by a left lane and a right lane; extracting one or more feature vectors from the input image;
simultaneously performing detecting of lane marks including a dotted lane type, a solid lane type, a lane color and road characters and classifying of a lane type of the left and right lanes, both the detecting and the classifying performed by using the one or more extracted feature vectors;
and generating a lane map along with the lane marks, wherein the detecting of the lane marks includes computing six coefficient in two parabolic equations, each parabolic equation with three coefficients indicating a quadratic curve for the left lane or the right lane using the one or more extracted feature vectors, and applying a pre-learned value; wherein the classifying of the lane type includes obtaining lane type features for the left and right lanes based on the one or more extracted feature vectors by converting the lane type features to a four-dimensional feature vector which represents a four four-dimensional vector class of the left and right lanes, comparing the lane type features by comparing the four-dimensional feature vector with the four four-dimensional vector classes, and classifying the lane type of the left and right lanes based on the comparison, and plotting the lane map in real time on a display.

2. The method of claim 1, wherein the input image is a Ground Truth (GT) image generated from an original image using a lane labeler tool.

3. The method as claimed in claim 1, wherein the input image is an RGB image that comprises a scene covered in a FOV of the image sensor configured to capture front view from the host vehicle.

4. The method of claim 1,
wherein the six coefficients represent a curvature of the road.

5. The method of claim 1, wherein the lane type features comprise a lane boundary, a starting position, a direction, grey-level intensity features, edge orientations, a shape, a position of an object in the image, an aspect ratio that are implicitly learned and modelled in a deep learning system.

6. The method of claim 1, wherein the detecting of the lane marks comprises distinguishing a lane mark from objects present/drawn on the road.

7. The method of claim 1, wherein the generating a lane map along with lane marks further comprises:
concatenating steps of the lane detection and the classification; and
plotting the lane map in real time on a display.

8. A system for real-time continuous lane mapping for a host vehicle, comprises: an image sensor configured to capture an image of a road, in which the host vehicle drives, the road defined at least by a left lane and a right lane; and a controller communicatively connected to the image sensor and configured to: receive the image of the road captured by the image sensor; extract one or more feature vectors from the image; simultaneously perform detecting of lane marks and classifying of a lane type of the left and right lanes, both the detecting and the classifying performed by using the one or more extracted feature vectors; and generate a lane map along with the lane marks, wherein the detecting of the lane marks by—includes computing six coefficients in two parabolic equations, each parabolic equation with three coefficients indicating a quadratic curve for the left lane or the right lane using the one or more extracted feature vectors, and applying a pre-learned value; wherein the classifying of the lane type includes obtaining lane type features for the left and right lanes based on the one or more extracted feature vectors by converting the lane type features to a four-dimensional feature vector which represents a four four-dimensional vector class of the left and right lanes, comparing the lane type by comparing the four-dimensional feature vector with the four four-dimensional vector classes, and classifying the lane type of the left and right lanes-based on the comparison$_1$ and plotting the lane map in real time on a display.

9. The system of claim 8, wherein the six coefficients representing a curvature of the road.

10. The system of claim 8, wherein the controller is further configured to detect a lane boundary, a starting position, a direction, grey-level intensity features from the lane type features, edge orientations, a shape, a position of an object in the image, an aspect ratio that are implicitly learned and modelled in a deep learning system.

11. The system of claim 8, wherein the controller is further configured to identify the lane mark based on a dotted lane type, a solid lane type, a lane color and road characters.

12. The system of claim 8, wherein the controller is further configured to:
concatenate the lane detection and the classification to generate the lane map along with lane marks; and
plot the lane map along with the lane marks in real time.

13. A non-transitory computer-readable medium comprising computer-readable instructions for real-time continuous lane mapping for a host vehicle, when executed by a processor, causes the processor to: receive an input image of a road, in which the host vehicle drives, captured by an image sensor mounted on the host vehicle, the road defined at least by a left lane and a right lane; extract one or more feature vectors from the image; simultaneously perform detecting of lane marks and classifying of a lane type of the left and right lanes, both the detecting and the classifying performed by using the one or more extracted feature vectors; and generate a lane map along with the lane marks, wherein the detecting of the -lane marks includes computing six coefficients in two parabolic equations, each parabolic equation with three coefficients indicating a quadratic curve for the left lane or the right lane using the one or more extracted feature vectors, and applying a pre-learned value; wherein the classifying of the lane type includes obtaining lane type features for the left and right lanes based on the one or more extracted feature vectors by converting the lane type features to a four-dimensional feature vector which represents a four four-dimensional vector class of the left and right lanes, comparing the lane type by comparing the four-dimensional feature vector with the four four-dimensional vector classes, and classifying the lane type of the left and right lanes based on the comparison, and plotting the lane map in real time on a display.

14. The computer-readable medium of claim 13, wherein the six coefficients representing a curvature of the lane on the road.

15. The computer-readable medium of claim 13, further comprising instructions that cause the processor to detect a lane boundary, a starting position, a direction, and grey-level intensity features from the lane type features from the lane type features, edge orientations, a shape, a position of an object in the image, an aspect ratio that are implicitly learned and modelled in a deep learning system.

16. The computer-readable medium of claim 13, further comprising instructions that cause the processor to identify the lane marks based on a dotted lane type, a solid lane type, a lane color and road characters.

17. The computer-readable medium of claim 13, further comprising instructions that cause the processor to concatenate the lane detection and the classification to generate the lane map along with lane markings.

18. The computer-readable medium of claim 13, further comprising instructions that cause the processor to plot the lane map along with the lane marks in real time.

19. The method of wherein the predetermined lane classes are four four-dimensional vector classes consisting of
[1,0,0,0]-Solid, Solid
[0,1,0,0]-Solid, Dotted
[0,0,1,0]-Dotted, Solid
[0,0,0,1]-Dotted, Dotted.

* * * * *